United States Patent [19]

Shima et al.

[11] 4,434,377
[45] Feb. 28, 1984

[54] ELECTRIC POWER-FEEDING STRUCTURE

[75] Inventors: Eiji Shima, Oota; Hiroshi Den, Yotsukaido; Takeo Kuroki, Funabashi, all of Japan

[73] Assignees: FEPS International, Ltd.; The Fujikura Cable Works, Ltd., both of Tokyo, Japan

[21] Appl. No.: 389,088

[22] Filed: Jun. 16, 1982

[51] Int. Cl.³ .......................... H05K 7/06; H02B 1/08
[52] U.S. Cl. ..................................... 307/147; 361/412
[58] Field of Search ................. 307/42, 147; 361/332, 361/352, 358, 397, 412; 174/72 TR, 117 F, 117 PC; 187/29 ES

[56] References Cited

U.S. PATENT DOCUMENTS

| | | | |
|---|---|---|---|
| 1,625,125 | 4/1927 | Latour | 307/147 X |
| 2,906,808 | 9/1959 | Krauss | 307/147 X |
| 3,052,749 | 9/1962 | Snapp et al. | 361/412 X |
| 3,626,082 | 12/1971 | Kasai et al. | 307/147 X |
| 3,715,627 | 2/1973 | D'Ausilio | 307/147 X |
| 4,221,756 | 9/1980 | Piper et al. | 174/117 F X |
| 4,234,146 | 11/1980 | Shima et al. | 174/117 F X |
| 4,307,438 | 12/1981 | Grubb | 361/412 X |

FOREIGN PATENT DOCUMENTS 55-43959  3/1980  Japan .

Primary Examiner—Donald A. Griffin
Attorney, Agent, or Firm—Armstrong, Nikaido, Marmelstein & Kubovcik

[57] ABSTRACT

In an electric power-feeding structure for feeding an electric power from an electric power-supply terminal to electric power-receiving portions located at different positions, which comprises a main feeder assembly connected to the electric power-supply terminal and comprising a plurality of main line sections and a plurality of junction means respectively interposed between respective mutually adjacent main line sections and a plurality of branch feeder lines respectively connected, at their respective one ends, to a plurality of the electric power-receiving portions and, at their respective other ends, to the respective main line sections, the improvement in which said plurality of junction means each comprising at least one printed circuit board provided with first and second connecting portions and at least one third connecting portion and said main line sections comprise at least one flat type cable with flat connector means and are successively connected by cooperation of said first and second connecting portions with said flat connector means, said at least one third connecting portion being connected to a flat connector means secured to the end of each of said branch feeder lines. The present structure can be simply constructed and effective for exactly feeding an electric power to the differently-positioned power-receiving portions.

9 Claims, 11 Drawing Figures

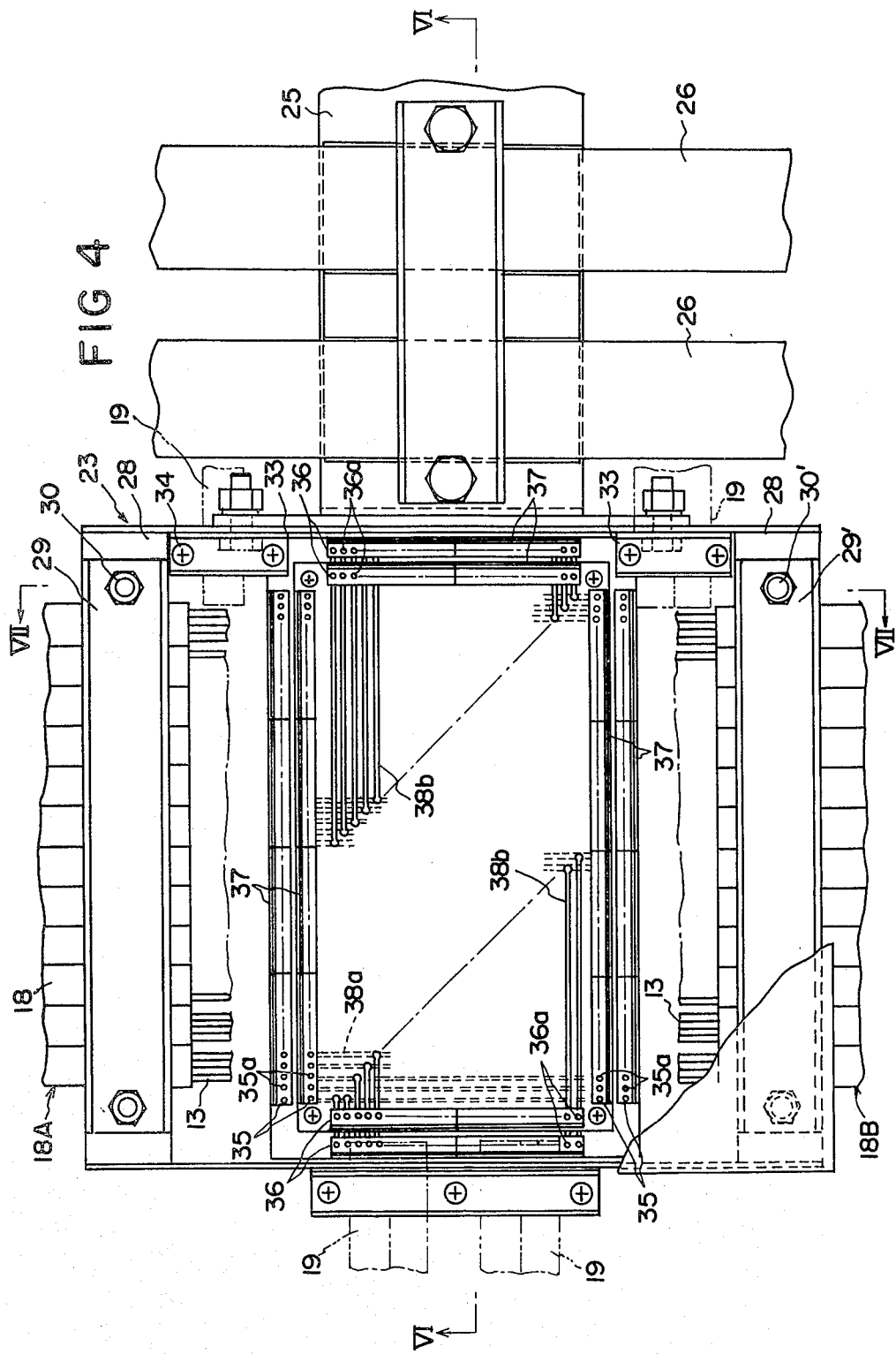

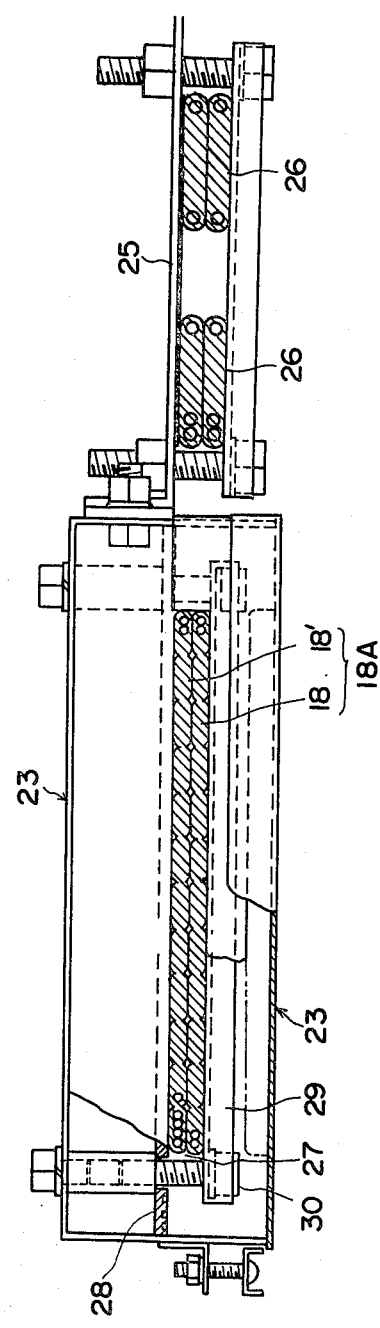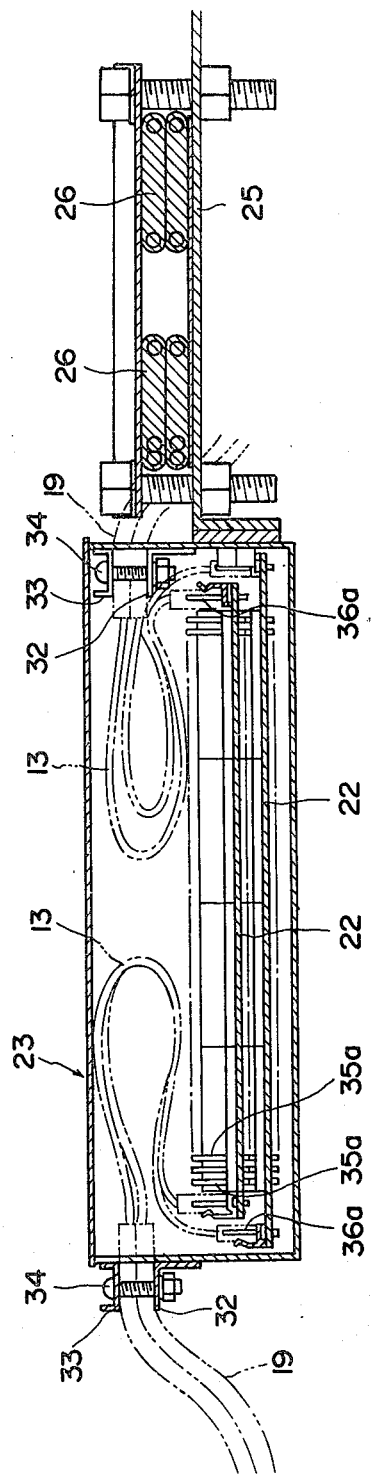

ELECTRIC POWER-FEEDING STRUCTURE

This invention relates to an electric power-feeding structure and more particularly to an electric power-feeding structure, for example, for use in a fixed power-feeding system for operation of an electrically powered elevator (not limited thereto), in which the electric power is fed from an electric power-supply terminal such as a control board or a panel board to each of a plurality of power-receiving portions (terminal equipments) located at different positions through a main feeder line connected to the electric power-supply terminal and, in turn, through a plurality of branch feeder lines branched from the main feeder line at a plurality of portions thereof arranged in a longitudinal direction with respect to the main feeder line.

In a typical electric power-feeding structure conventionally employed, for example, in a fixed power-feeding system for operation of an elevator in which the electric power is fed from a control board mounted in a machine room to the terminal equipments provided at each platform of every floor such as floor indicators, push buttons, etc., insulated conductors such as polyvinyl chloride resin-insulated conductors are employed as feeder lines for an electric power. In such a conventional electric power-feeding structure, there is employed a main duct assembly extending in a hoistway for the elevator cage in a vertical direction along the side wall surface of the hoistway. The main duct assembly comprises a plurality of main duct sections successively arranged vertically and a plurality of junction boxes respectively interposed between respective mutually adjacent main duct sections and connecting the respective mutually adjacent main duct sections therethrough. A plurality of insulated conductors are inserted in the above-mentioned main duct assembly. On the other hand, a plurality of branch ducts are respectively connected to the above-mentioned junction boxes, and a plurality of insulated conductors are inserted in each branch duct and connected, at their respective one ends, to the insulated conductors running through the main duct assembly and, at their respective other ends, to the terminal equipments.

With such a conventional type of an electric power-feeding structure, due to the use of the main duct and the branch duct which each accomodate therein the insulated conductors, a fear of mechanical damage or breakage of the insulated conductors can be eliminated. However, the duct construction requires a great deal of labor as well as a lot of time and, in addition, the well-skilled workers are required for such a construction. Moreover, constructing of such a conventional type of an electric power-feeding structure inevitably requires so complicated and troublesome procedures as follows. Illustratively stated, a number of insulated conductors are measured off to have a predetermined length and, then, formed into a bundle. The bundle thus formed is inserted into the main duct to run therethrough. On the other hand, a number of insulated conductors are measured off to have a predetermined length and inserted in each branch duct. The insulated conductors in each branch duct are connected, at their respective one ends, to the insulated conductors in the main duct assembly in such a manner that the junction box is opened and the former insulated conductors are connected to the latter insulated conductors one by one by a manual operation.

Such complicated procedures as described above inevitably cause an unfaborable prolongation of working hours and, in addition, require a great deal of labor. Furthermore, owing to the fact that connection of the insulated conductors must be conducted manually, an improper connected of the insulated conductors or other accidental errors in constructing the electric power-feeding structure are apt to occur.

On the other hand, in order to cope with the above-mentioned problem, there was proposed such a method that connection of the insulated conductors to be accommodated in each branch duct to the insulated conductors to be accomodated in the main duct assembly is effected in advance at a factory in a predetermined relationship or arrangement so that they can be suited to the arrangement of ducts in the electric power-feeding structure. Such connected insulated conductors are known as a prefabricated "wire harness", and the use of which, needless to say, removes necessity of such complicated procedures as cutting, binding and connecting of the insulated conductors at the construction site, and hence, the substantial operation to be conducted at the construction site for constructing the electric power-feeding structure is facilitated and simplified to some extent. However, even in case such a wire harness is employed, the duct construction is also required because the thus formed wire harness should also be accommodated in the duct. Further, the production of the wire harness also involves such complicated and troublesome procedures as cutting, binding and connecting of the insulated conductors. In this respect, the use of the wire harness also does not lead to economy of time and labor required for the entire process for constructing the electric power-feeding structure. In addition, occurrence of some accidental errors in constructing the structure cannot be avoided completely even by the use of the above-mentioned wire harness.

For the purpose of giving a solution to the above-mentioned problems, the present inventors previously proposed in Japanese patent application Laid-open specification No. 55-43959 an electric power-feeding structure for operation of an electrically powered elevator in which feeder cables such as flat type cables are employed as means for conducting electric power instead of the insulated conductors. In the proposed method, instead of the main duct assembly with the insulated conductors inserted therein and the branch ducts with the insulated conductors inserted therein, there are employed a main feeder cable and branch feeder cables, respectively. By the use of the cables, the duct in which the insulated conductors are accommodated becomes unnecessary and, hence, the duct construction can be omitted from the entire process for constructing the electric power-feeding structure. Also, due to the use of cables, troublesome procedures such as binding of the insulated conductors and insertion thereof into the ducts can be eliminated. However, it is to be noted that the construction of the proposed electric power-feeding structure cannot be free from troublesome procedures as experienced in constructing the conventional type of a power-feeding structure, because connection of the cables must also be conducted in such a manner that the insulated core conductors of the branch feeder cable are connected to the stripped portions of preselected insulated core conductors of the main feeder cable one by one by a manual operation. Accordingly, time and labor required for the connecting operation of cables cannot be saved to a desirable extent. On the other hand, in the proposed electric power-feeding structure, use is made of a flat type cable with such a construction that a plurality of insulated core conductors are stranded to form a stranded conductor and a plurality of the thus formed stranded conductors are arranged in parallel in a substantially coplanar relationship. With this type of a flat type cable, it is difficult to strip the sheath of the insulated core conductor of the main feeder cable by the use of an automatic apparatus in order to expose the naked core conductor to which the core conductor of the branch feeder cable is to be connected. In addition, in connecting the cables, the outer jacket of each branch feeder cable must be removed to expose a sufficient part of each stranded conductor of the branch feeder cable for connection thereof. The stranded conductors are left exposed and unconnected for a long period of time during the course of the cable-connecting operation and, therefore, the insulated core conductors of the branch cable are likely to separate irregularly from each other or to be entangled, thus leading to a fear of improper connection of the cables.

Accordingly, it is an object of the present invention to provide an improved electric power-feeding structure which can be easily constructed without any complicated and troublesome procedures as required in constructing the conventional electric power-feeding structure.

The foregoing and other objects, features and advantages of the present invention will be apparent to those skilled in the art from the following detailed description taken in connection with the accompanying drawings in which:

FIG. 4 is an enlarged front view of an essential portion of a junction means of the electric power-feeding structure shown in FIG. 3, shown in connection with main and branch feeder cables;

FIG. 5 is a top view of the junction means shown in FIG. 4, partly shown in cross-section;

FIG. 6 is a sectional view taken along the line VI-VI of FIG. 4;

Figure 1:
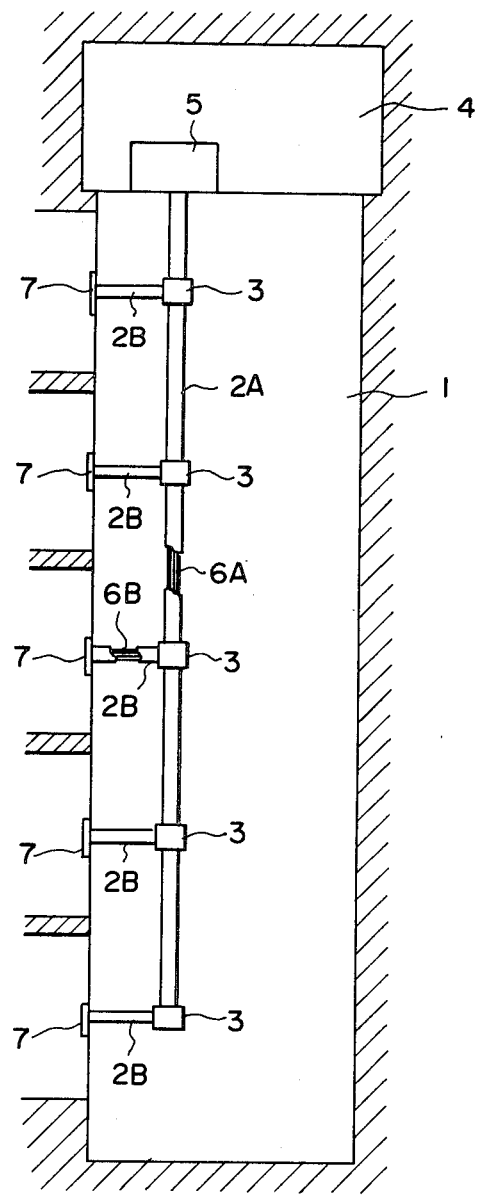
FIG. 1 is a schematic view of a conventional electric power-feeding structure adapted to be used for a power-feeding system for operation of an elevator.

In FIGS. 1 through 11, like parts or portions are designated by like reference numerals or characters.

Referring to FIG. 1, there is shown a schematic illustration of a conventional type of an electric power-feeding structure adapted to be used in a power-feeding system for operation of an elevator. In such a conventional electric power-feeding structure, there is employed a main duct assembly 2A extending in a hoistway 1 for the elevator cage (not shown) in a vertical direction along the side wall surface of the hoistway 1. The main duct assembly 2A comprises a plurality of main duct sections successively arranged vertically and a plurality of junction boxes 3 respectively interposed between respective mutually adjacent main duct sections and connecting the respective mutually adjacent main duct sections. A plurality of insulated conductors 6A are inserted in the above-mentioned main duct assembly 2A. On the other hand, a plurality of branch ducts 2B are respectively connected to the above-mentioned junction boxes 3, and a plurality of insulated conductors 6B are inserted in each branch duct 2B and connected, at their respective one ends, to the insulated conductors 6A running through the main duct assembly 2A and, at their respective other ends, to the terminal equipments 7. As described before, owing to the use of the insulated conductors, such a conventional structure requires a lot of time and a great deal of labor in construction. In addition, due to a fact that the entire procedures required for connection of the insulated conductors must be carried out by a manual operation, there is a danger of occurrence of an improper connection of the insulated conductors, or other accidental errors in constructing the electric power-feeding structure.

As a result of intensive studies of the present inventors with a view to obviating the above-mentioned drawbacks and developing an improved electric power-feeding structure, the present invention has been made.

According to the present invention, there is provided an electric power-feeding structure for feeding an electric power from an electric power-supply terminal to electric power-receiving portions located at different positions through a main feeder line and, in turn, through branch feeder lines branched from the main feeder line, which comprises:

(a) a main feeder assembly connected to an electric power-supply terminal, said main feeder assembly comprising a plurality of main line sections successively arranged in a longitudinal direction of each of said main line sections and a plurality of junction means respectively interposed between respective mutually adjacent main line sections and connecting the respective mutually adjacent main line sections therethrough;

said plurality of main line sections each comprising at least one flat type cable which comprises an outer jacket and a plurality of insulated core conductors arranged in parallel in a substantially coplanar relationship and covered by said outer jacket, said plurality of insulated core conductors each comprising a plurality of element conductors covered by a sheath of an insulating material;

said at least one flat type cable having at least one end provided with a flat connector means electrically connected thereto;

said flat connector means having electric connector portions which are arranged in a row, said plurality of junction means each comprising at least one printed circuit board having, on at least one surface thereof, a predetermined pattern circuit, said at least one printed circuit board having a first connecting portion for detachably connecting thereto the flat connector means of the flat type cable of a main line section and a second connecting portion for detachably connecting thereto the flat connector means of the flat type cable of an adjacent main line section to said main line section;

said first connecting portion being electrically connected to said second connecting portion through said predetermined pattern circuit;

said at least one printed circuit board having at least one third connecting portion being electrically connected to said first and second connecting portions through said predetermined pattern circuit;

and (b) a plurality of branch feeder lines respectively connected to a plurality of electric power-receiving portions located at different positions respectively corresponding to the positions of said plurality of junction means, said plurality of electric power-receiving portions each comprising at least one terminal equipment;

each branch feeder line comprising at least one feeder cable;

said at least one feeder cable having its one end connected to said at least one terminal equipment and having the other end provided with a flat connector means electrically connected thereto;

said flat connecting means of the other end of the feeder cable being detachably connected to the third connecting portion of the printed circuit board.

Preferred embodiment of the present invention will now be described with reference to FIGS. 2 to 11.

Figure 2:
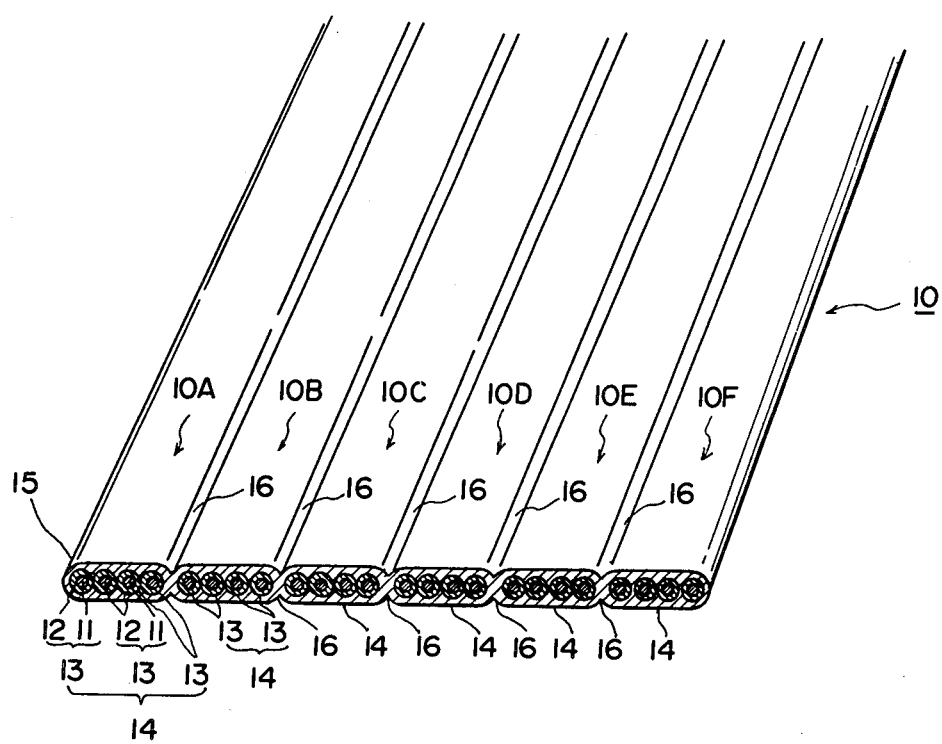
FIG. 2 is a partly cut-away diagrammatic perspective view of one form of a flat type cable to be used in an electric power-feeding structure according to the present invention.

Referring now to FIG. 2, there is diagrammatically illustrated one form of a flat type cable to be used in an electric power-feeding structure according to the present invention. A plurality of insulated core conductors 13 each comprising a plurality of element conductors 11 and a sheath of an insulating material 12 are arranged in parallel in such a manner that each insulated core conductor 13 is in contact with adjacent ones to form a group of insulated core conductors 14. Further, a plurality of the thus formed groups of insulated core conductors 14 are arranged in parallel in a substantially coplanar relationship. A plurality of such groups of insulated core conductors are covered by an outer jacket 15, for example, made of an insulating material such as rubber, synthetic resin or the like, or a semiconductive coating material. The outer jacket made of an insulating material may further be provided thereon with a metallic armor in order to protect the flat type cable more sufficiently. On both sides of the outer jacket 15, in the middle of mutually adjacent groups of insulated core conductors 14, there are provided grooves 16 extending in a direction parallel to the axis of each of the insulated core conductors 13. Thus, there is formed a flat type cable 10 having a flat shape in cross section. The flat type cable 10 shown in FIG. 2 is composed of a plurality of unit cables 10A, 10B, . . . 10F along the line in which the groove 16 is provided. Accordingly, the flat type cable of the above-mentioned structure can be divided into a plurality of unit cables 10A, 10B, . . . 10F each comprising a plurality of insulated core conductors 13, by tearing up the outer jacket 15 along each of the grooves 16 so as to separate each group of insulated core conductor 14 from the adjacent ones. Each of the thus divided unit cables 10A, 10B, . . . 10F can also be used as a feeder cable separately.

Figure 3:
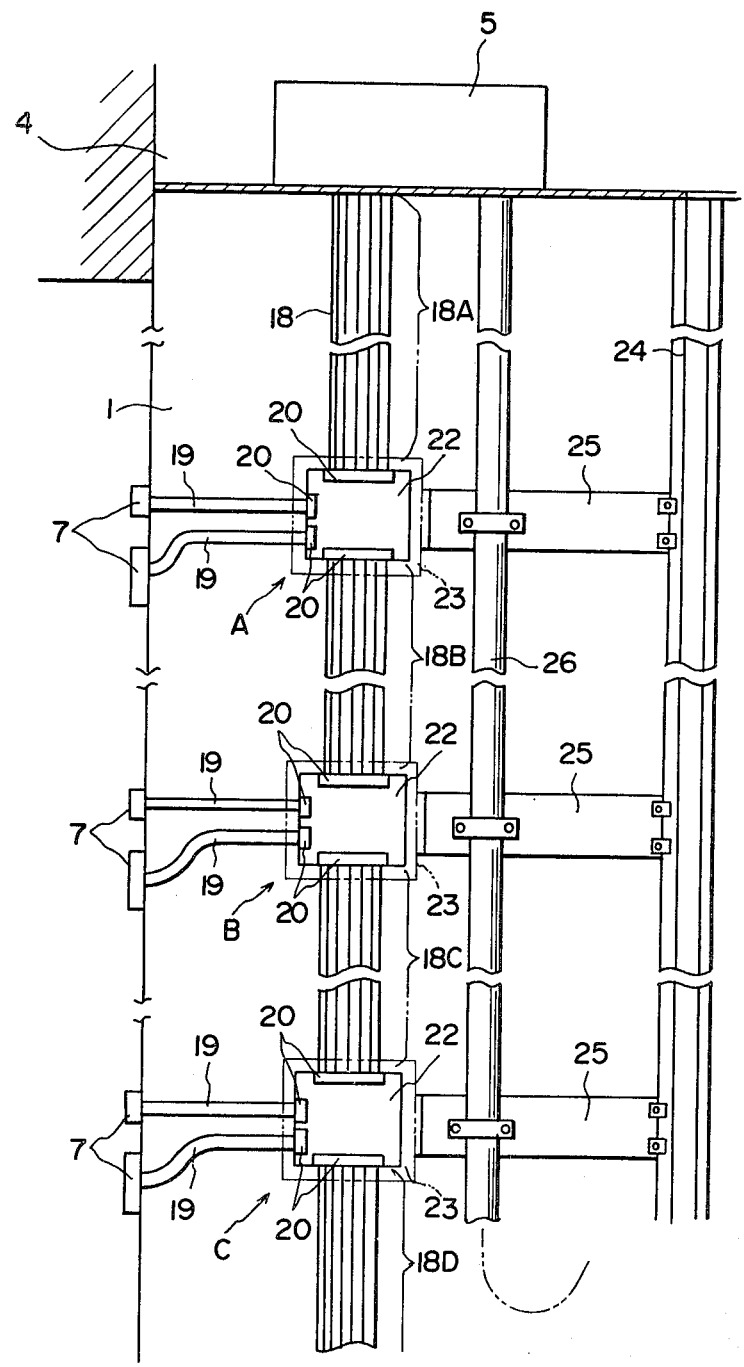
FIG. 3 is a schematic view illustrating one form of an electric power-feeding structure according to the present invention which is adapted to be used in a power-feeding system for operation of an elevator.
Figure 7:
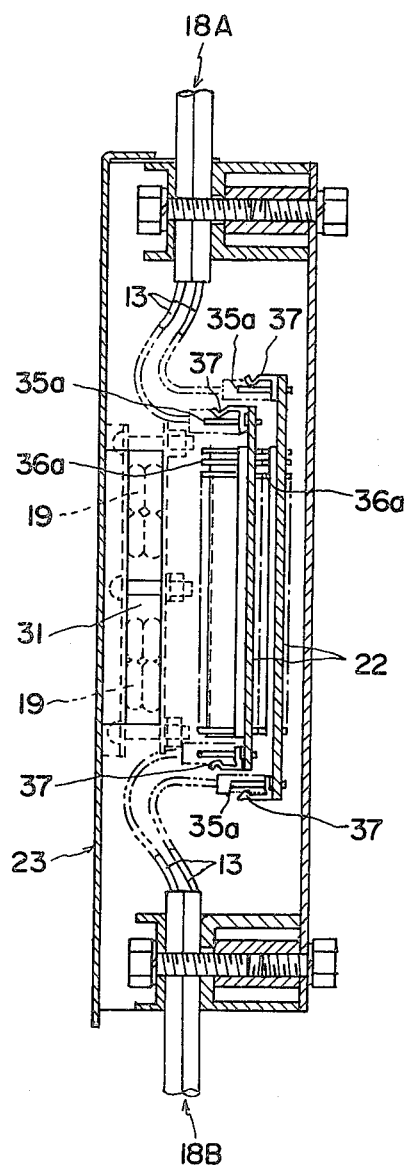
FIG. 7 is a sectional view taken along the line VII-VII of FIG. 4.
Figure 8:
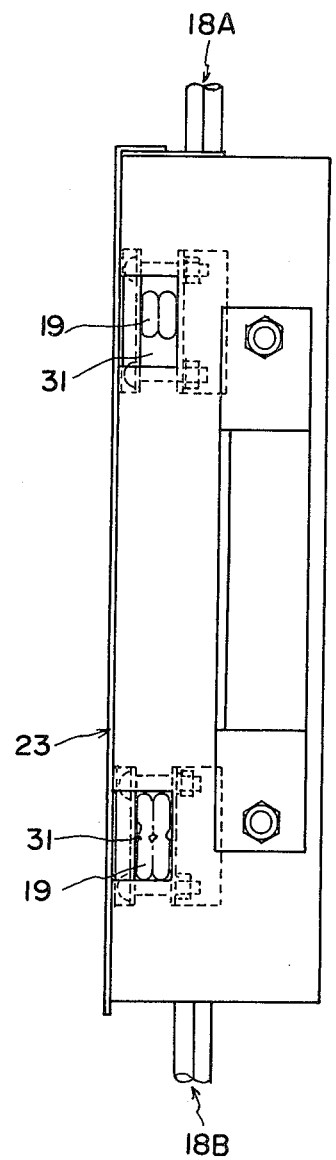
FIG. 8 is a side view of the junction means shown in FIG. 4, as viewed from the right.

Referring next to FIG. 3, there is schematically illustrated one form of an electric power-feeding structure according to the present invention adapted to be used in a power-feeding system for operation of an electrically powered elevator, in which the flat type cable 10 shown in FIG. 2 is employed as a main feeder cable. In such an electric power-feeding structure, the electric power is fed from a control board 5 in a machine room 4 provided at the top of a hoistway 1 for an elevator cage (not shown) to a plurality of terminal equipments 7 (hereinafter referred to as "electric power-receiving portions") provided at each platform of every floor through a main feeder cable assembly connected to the control board 5 and extending downwardly in a vertical direction with respect to the ground, and comprising a plurality of main line sections 18A, 18B, 18C, 18D, . . . successively arranged in a vertical direction and a plurality of junction means A, B, C, . . . respectively interposed between respective mutually adjacent main line sections and connecting the respective mutually adjacent main line sections therethrough, and, in turn, through branch feeder lines 19 respectively connected to a plurality of electric power-receiving portions 7 respectively located at different floors. With respect to the number of junction means, it should be noted that the main feeder assembly having only one junction means also falls within the scope of the present invention. Each of the main line sections 18A, 18B, 18C, 18D, . . . comprises one flat type cable or two or more flat type cables thicknesswise laid one upon another. At least one end of the above-mentioned at least one flat type cable is provided with a flat connector means 20 (which will be mentioned later) electrically connected thereto. On the other hand, each of the branch feeder lines comprises at least one flat type cable or at least one unit cable (see 10A, 10B, 10C, . . . 10F in FIG. 2) torn apart from the above-mentioned flat type cable. Any of the above-mentioned flat type cable and one unit cable (10A, 10B, 10C, . . . 10F in FIG. 2) has its one end connected to at least one termimal equipment, and its other end provided with a flat connector means 20 electrically connected thereto. However, the type of a feeder cable to be employed for the branch feeder line is not restricted to a flat type cable 10 as is shown in FIG. 2. A flat type cable comprising a plurality of stranded conductors or a round type cable having a round shape in cross section may also be employed. However, in order to simplify the procedures required in constructing the electric power-feeding structure according to the present invention, the flat type cable 10 or unit cables divided therefrom as depicted in FIG. 2 may preferably be employed.

Meanwhile, each of the junction means A, B, C . . . comprises a junction box 23 and at least one printed circuit board 22 accommodated therein which has, on at least one surface thereof, a predetermined pattern circuit (which will be mentioned later). The flat connector means 20 of the lower end of the main line section 18A is detachably connected to a first connecting portion (which will be mentioned later) of the printed circuit board 22 of the top junction means A. The main line section 18B has, at its upper and lower ends, flat connector means 20,20 which are detachably connected to a second connecting portion (which will be mentioned later) of the printed circuit board 22 of the top junction means A and the first connecting portion of the printed circuit board 22 of the next junction means A, respectively. Similarly, the remaining main line sections 18C, 18D are connected successively through the printed circuit boards of the junction means. The first and second connecting portions of each printed circuit board are electrically connected through the printed pattern circuit of the printed circuit board. On the other hand, the flat type connector means 20 of the right end of the branch feeder line 19 is also detachably connected to a third connecting portion (which will be mentioned later) of the printed circuit board 22, which is electrically connected to the above-mentioned first and second connecting portions through the printed pattern circuit.

With such a structure, the main line sections 18A, 18B, 18C, 18D, ... and the branch feeder lines 19,19 ... are electrically connected through the printed pattern circuits of the junction means.

Meanwhile, junction boxes 23 are fixedly attached to supports 25, respectively which extend from an elevator cage-guiding rail 24 horizontally with respect to the ground. To each of the supports 25, the upper portion of a moving feeder cable 26 which does not substantially move is fixed. The control board 5 mounted in the machine room 4 is also connected with an elevator cage through the moving feeder cable 26.

Turning now to FIGS. 4 through 9, there is shown a manner of connection of the main feeder cable to the branch feeder cables which is used in one preferred embodiment of the present invention, that is, there is illustrated a structure of one form of each of junction means A, B, C ... shown in FIG. 3. Each junction means comprises a junction box 23 and two printed circuit boards 22 provided therein. In this embodiment, a plurality of main line sections each comprise two flat type cables 18, 18' (see FIG. 5). That is, each main line section 18A, 18B, 18C, 18D having a predetermined length comprises two flat type cables which are thicknesswise laid one upon another. The number of flat type cables which constitute each main line section is not limited. Only one flat type cable may constitute each main line section and two or more flat type cables may constitute each main line section.

Figure 9:
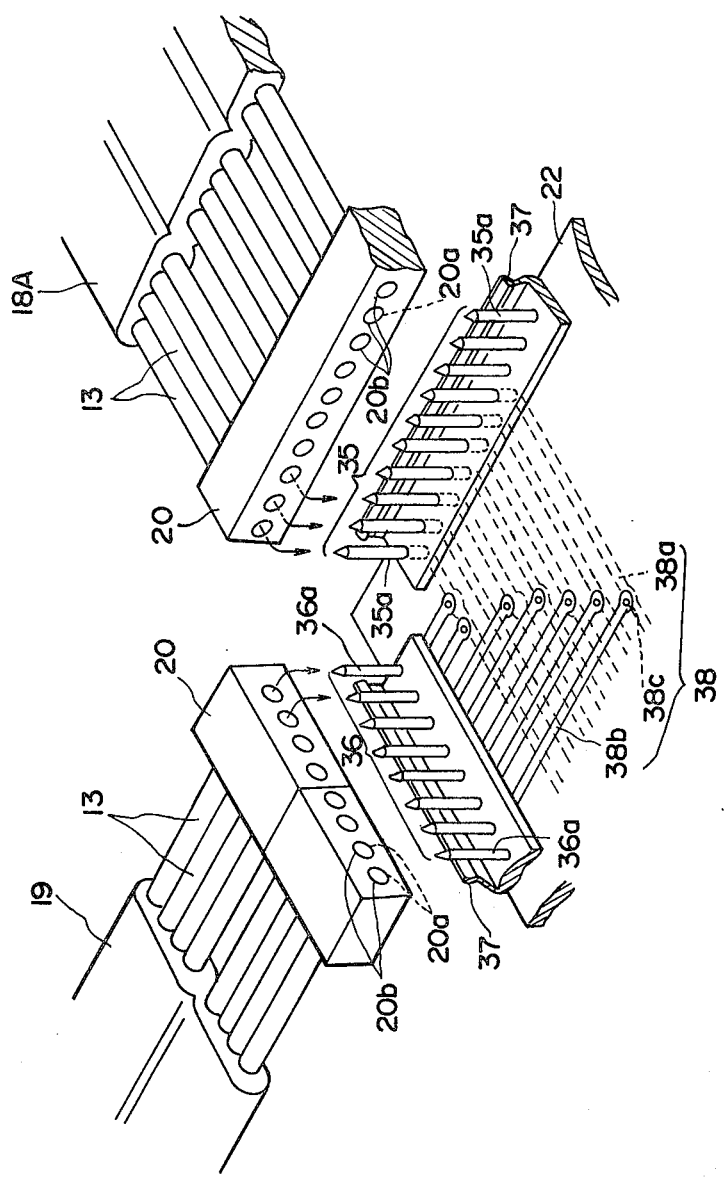
FIG. 9 is a schematic perspective view illustrating how the main and branch feeder cables are connected to a printed circuit board of the junction means shown in FIG. 4.

A flat type connector means 20 is electrically, mechanically connected to the end of the flat type cable of each main line section as depicted in FIG. 9 illustrating how the main and branch feeder cables are connected to a printed circuit board of the junction means shown in FIG. 4. In the flat connector means 20 are formed a plurality of pin insertion holes 20b in a row. In each of the pin insertion holes 20b is provided an electric connector portion 20a which is electrically connected to the bundle of the element conductors 11 of each of the insulated core conductors 13. Similarly, a flat connector means 20 is connected to the end of each of a predetermined number of flat type branch feeder cables 19 constituting a branch feeder line. The number of the connector portion 20a-having holes 20b of the flat connector means 20 to be used does not necessarily correspond to the number of the insulated core conductors 13 of the flat type cable 18 of the main line section or the flat type branch feeder cable 19 of the branch feeder line. The number of the insulated core conductors 13 of the flat type cable 18 of the main line section or the flat type branch feeder cable 19 may be larger or smaller than that of the connector portion 20a-having holes 20b of the flat connector means 20 for the flat type cable 18 or the flat type branch feeder cable 19. In other words, some of the insulated core conductors or some of the connector portion 20a-having holes 20b may be left idle according to designing or availability of the rated flat type cables. The arrangement of connector portion 20a-having holes 20b of the flat connector means for the branch feeder cable depends on the kind of the branch feeder cable and is not necessarily of a row. In a flat connector means for the branch feeder cable, the connector portion-having holes may be arranged in more than one rows.

The junction box 23 is secured to the end portion of the support 25 which extends horizontally from an elevator cage-guiding rail 24 (see FIG. 3).

In FIGS. 4 through 8, there is illustrated an essential portion of a junction means of the electric power-feeding structure shown in FIG. 3, shown in connection with main and branch feeder cables. The junction box 23 has, in its upper portion, an upper open space 27 in which the lower end portions of the two flat type cables 18,18' constituting the main line section 18A and each having the flat connector means 20 (see FIG. 9) are insertedly secured. In the upper open space 27, the lower end portions of the flat type cables 18,18' are sandwiched and fixedly secured, by means of a pair of screws 30, between a pressing member 29 and a support member 28 having a plurality of U-shaped grooves on its side contacting one side surface of the inserted main line section 18A. A lower open space like the upper open space 27 is formed at the inner lower portion of the junction box 23 and opens downward. In the lower open space of the junction box 23, the upper end portions of the two flat type cables 18,18' constituting another main line section 18B and each having the flat connector means 20 (see FIG. 9) are sandwiched between a supporting member 28' and a pressing member 29', and fixedly secured therebetween by means of a pair of screws 30'. On the right and left sides of the junction box 23 are formed a predetermined number of openings 31. The end portions of a predetermined number of the flat type branch feeder cables 19 constituting a branch feeder line and each having the flat connector means are inserted in the junction box 23 through each of the openings 31. A support member 32 and a pressing member 33 are provided in the junction box 23 in the vicinity of each of the openings 31 so that the flat connector means-having end portions of the flat type branch feeder cables 19 are supported between the support member 32 and the pressing member 33 by means of screws 34. In the same manner as stated above, a main line section and a branch feeder line are insertedly secured at their respective end portions, to the junction boxes of the junction means B and C.

In the junction box 23, there are disposed two rectangular printed circuit boards in parallel, leaving a spacing therebetween. The rectangular printed circuit boards each have a predetermined pattern circuit on their respective both surfaces, but they may have, on its one surface, a predetermined pattern circuit 38. The disposition of the rectangular printed circuit boards is along the direction of the main feeder line. On each of the printed circuit boards 22, a plurality of pins 35a made of a conductive material are provided in a row in the vicinity of and along each of the upper and lower sides of the printed circuit board. Two groups of the plurality of the pins 35a respectively provided along the upper and lower sides of the printed circuit board constitute a pair of connecting portions 35. Hereinafter, the connecting portion 35 comprising a plurality of pins 35a provided along the upper side of each of the printed circuit boards 22 is referred to as "first connecting portion" for detachably connecting thereto the flat connector means of the flat type cable of a main line section and the connecting portion 35 comprising a plurality of pins 35a provided along the lower side of each of the printed circuit boards 22 is referred to as "second connecting portion" for detachably connecting thereto the flat type cable of a next main line section. The positions at which the first and second connecting portions are respectively located are not restricted to the upper and lower portions of the printed circuit board but may be any other ones as far as they are suitably associated with the pattern circuit of the printed circuit board. The same also applies to a third connecting portion which will be mentioned shortly. As is understood from FIGS. 7 and 9, the flat connector means 20 connected to the end portion of each of the flat type cables of the main line sections 18A, 18B, 18C, 18D is fitted over a plurality of the pins 35a to insert the pins 35a into the pin insertion holes 20b of the connector means 20 as indicated by arrows in FIG. 9 so that the respective flat connector means 20 of the flat type cable of each of the main line sections 18A, 18B, 18C, 18D, are detachably connected to the first and second connecting portions and, at the same time, electrical connection therebetween is attained. In addition, on each of the printed circuit boards 22, a plurality of pins 36a made of a conductive material are provided in a row in the vicinity of and along the right and left sides (as viewed in FIG. 4) of each printed circuit board. Each group of the plurality of the pins 36a constitutes a connecting portion 36 (hereinafter referred to as "third connecting portion"), through which the flat connector means 20 secured to the end portion of the flat type branch feeder cable 19 is to be electrically connected to the printed circuit board. The flat connector means 20 connected to the end portion of each flat type branch feeder cable 19 is fitted over a plurality of the pins 36a to insert the pins 36a into the pin insertion holes 20b of the flat connector means of each branch feeder cable as indicated by arrows in FIG. 9 so that the flat connector means 20 provided with the electric connector portions 20a and connected to the end portion of the flat type branch feeder cable 19 is detachably connected to the third connecting portion 36 and, at the same time, electrical connection therebetween is attained. A resilient means 37 is provided in the vicinity of each of the first and second connecting portions 35 and the third connecting portions 36 so that each flat connector means 20 is resiliently engaged by the resilient means 37. On the rear side of each of the printed circuit boards 22 opposite to the front side having thereon the flat connector means 20 connected thereto, there is a rear side pattern circuit comprising a plurality of rear side conductor paths 38a. The pins 35a constituting the first connecting portion 35 of the upper portion of each printed circuit board 22 are electrically connected to the corresponding pins 35a constituting the second connecting portion 35 of the lower portion of each printed circuit board 22, respectively, through the rear side conductor paths. On the front side of each of the printed circuit boards 22 which side has thereon the flat connector means 20 connected thereto, there is a front side pattern circuit comprising a plurality of front side conductor paths 38b. The front side conductor paths 38b respectively extend to predetermined positions from two groups of the pins 36a respectively constituting the right and left third connecting portions 36 as depicted in FIGS. 4 and 9. A plurality of through-conductor paths 38c which serve to electrically connect the rear side conductor paths 38a and the front side conductor paths 38b in a predetermined relation. Thus, the printed pattern circuit 38 comprising the rear side pattern circuit, the front side pattern circuit and the through-conductor paths 38c cooperate with one another to electrically connect the first and second connecting portions and the third connecting portions 36 according to a predetermined circuitry.

The flat type cable (see FIG. 2) used as the main line section in the embodiment of the present invention comprises a plurality of unit cables 10A, 10B ... 10F as described above. The flat type cable can be easily torn and divided into the cables of desired widths, and then can be advantageously used as a branch feeder cable in the present invention. Illustratively stated, the flat type cable as seen in FIG. 2 is easy to stock or transport and the workers can easily prepare necessary quantities of branch feeder cables with desired widths from only one kind of the flat type cable as shown in FIG. 2, leading to an advantage that stock control is easy.

Figure 10:
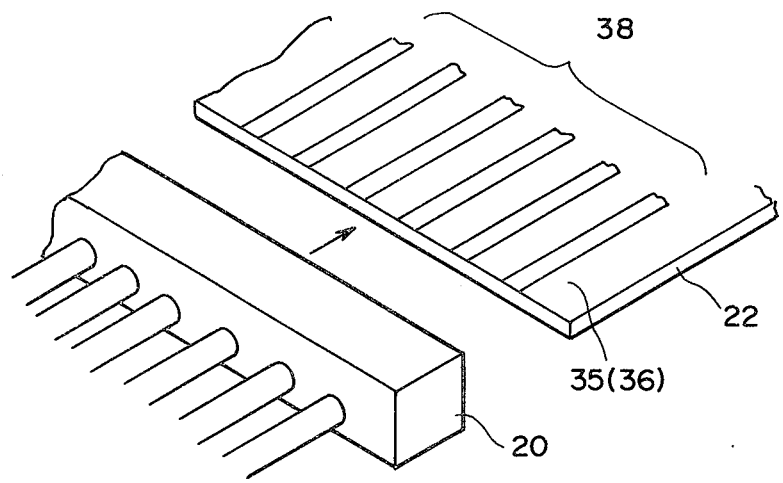
FIG. 10 is a perspective view of another form of a flat connector means for a feeder cable to be used in an electric power-feeding structure according to the present invention, shown with another type of edge of a printed circuit board to be used in a junction means.

In the embodiment of the present invention as shown in FIGS. 4 through 9, there is shown such a form that a plurality of the pins are used in the first and second connecting portions and in the third connecting portions. However, the present invention is not limited to such a form. For example, with respect to a flat connector means and first, second and third connecting portions, another form as shown in FIG. 10 may be employed. In this form, the terminals of a plurality of conductor paths constituting the printed pattern circuit 38 reach the edges of the printed circuit board 22 so that the terminals themselves can funtion as the first and second connecting portions 35 and the third connecting portion 36 of the printed circuit board. In this case, a socalled end connector type connector 20 is fitted over the edge portion of the printed circuit board 22 for mechanical, electrical connection as indicated by an arrow in FIG. 10. In In this form, the provision of a plurality of pins 35a, 36a as shown in FIG. 9 is not necessary, leading to an advantage that the manufacturing cost is reduced.

Turning back to FIG. 2, it is preferred that the sheath of the insulated core conductor positioned at the side end of the in-parallel arrangement of insulated core conductors in each unit cable 10A, 10B ... 10F be different in color from the sheaths of the other insulated core conductors. Such differentiation in color is extremely effective for avoiding improper connection of the insulated core conductors to the printed circuit board, which improper connection is apt to occur when the flat type cable is turned upside down. By adopting such differentiation in color, the troublesome marking of the numbers assigned to the respective insulated core conductors, which has hitherto been made, can be completely omitted, leading to an advantage that the manufacturing cost of flat type cables is reduced.

Figure 11:
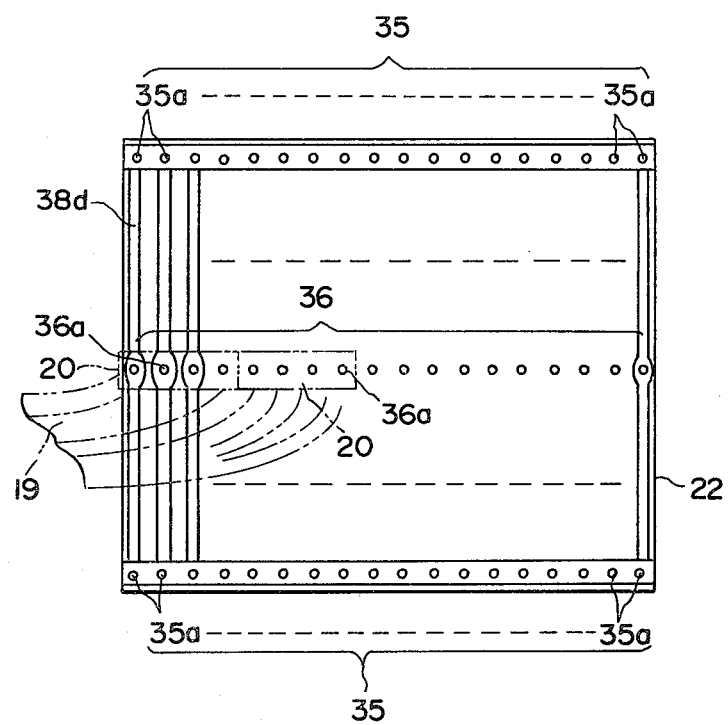
FIG. 11 is a front view of another form of a printed circuit board to be used in a junction means of the electric power-feeding structure according to the present invention.

The pattern of the printed pattern circuit 38 on the printed circuit board 22 is not limited to that shown in FIG. 4 or 9. The pattern of the printed pattern circuit may be varied in accordance with the predetermined design of connecting the branch feeder cable to the printed circuit board. As described before, the printed pattern circuit 38 may be formed only on one side of the printed circuit board. For example, there may be employed a printed circuit board as shown in FIG. 11. In such a printed circuit board, a plurality of conductor paths 38d which electrically connect the first and second connecting portions 35 with each other is formed on one side of the printed circuit board and a third connecting portion constituted of pins 36a for connecting the flat connector means 20 of the flat type branch feeder cable 19 is provided in the conductor paths 38d of the printed circuit 38 at their respective intermediate portions.

With respect to the conductor path or paths of the printed pattern circuit through which a relatively large current is likely to flow, a solid wire may be additionally provided in parallel to the conductor path and connected to, for example, the first and second connecting portions so that the current carrying capacity is increased.

The name or code of a terminal equipment, which is to be connected to the flat type cable of the main line section through the branch feeder cable and then the printed circuit board may be indicated at appropriate portions of the printed circuit board 22 near a pin or pins of the third connecting portion 36 which are assigned for the terminal equipment. Such indication of the name or cord of the terminal equipment ensures proper connection more reliably.

According to the electric power-feeding structure of the present invention, each insulated core conductor of the main line section can be connected to each insulated core conductor of the branch feeder cable by only connecting the flat connector means which are respectively connected to the end portions of the cables of the main line section and the branch feeder line to the first and second connecting portions and the third connecting portions on a printed circuit board. Therefore, time and labor required for the connecting operation can remarkably be decreased. Further, according to the present invention, in connecting the electric cables, it is not necessary to connect the insulated core conductors of the branch feeder cable to the stripped portions of the preselected insulated core conductors of the flat type cable of the main line section one by one by a manual operation, leading to a remarkable decrease or occurrence of wrong or improper connection. Since the insulated core conductors of the flat type cable of the main line section are arranged in parallel in a substantially coplanar relationship, the exposure of the bundles of the element conductors by stripping the sheaths can be automatically performed by a simple, single operation. Further, since the flat connector means in which the electric connector portions are arranged in a row is used as a connector means the operation for connecting the bundles of the element conductors to the connector means can be automatically performed. Therefore, operations such as cutting off of the flat type cable, stripping of the sheaths of the insulated core conductors and connection of the exposed end portions of the bundles of element conductors to a flat connector means can be performed fully automatically so that time and labor are saved. Further, with the electric power-feeding structure of the present invention, the duct construction therefor is not required, leading to a remarkable decrease of time, labor and material in constructing the electric power-feedng structure. Still further, since the flat type cable is used as the main line section, the space occupied by the electric power-feeding structure is saved by properly arranging the flat type cable to be employed in the electric power-feeding structure.

The printed circuit board to be employed in each junction means of the present electric power-feeding strcuture may have the same pattern circuit which is adapted to branch all the insulated core conductors of the main line section, that is, adapted to connect all the insulated core conductors of the main line section to a third connecting portion. In this case, when the branching manner of the electric current flowing through the insulated core conductors of the main line section is different at each junction means, the positions of the respective third connecting portion to which a branch connector means is to be connected are changed according to the respective junction boxes so that the electric current flowing through the insulated core conductors of the main line section can be properly branched at each junction means. When the printed circuit board to be employed in each junction means has the same pattern circuit which is adapted to branch all the insulated core conductors of the main line section, the increase in cost due to the use of printed circuit boards is avoided since the printed circuit boards of the same pattern circuit can be mass-produced at low cost.

As described, according to the present invention, there is provided an electric power-feeding structure which is extremely effective for exactly feeding an electric power from an electric power-supply terminal to electric power-receiving portions located at different positions through a main feeder line and, in turn, through branch feeder lines branched from the main feeder line, and which is simple in structure and easy to construct. The electric power-feeding structure is especially useful for use in a fixed power-feeding system for operation of the elevator in which the electric power is fed from a control board mounted in a machine room to the terminal equipments provided at each platform of every floor such as floor indicators, push buttons, etc.

What is claimed is:

1. An electric power-feeding structure for use in a fixed power-feeding system for operation of an electrically powered elevator in which an electric power is fed from an electric power-supply terminal to electric power-receiving portions located at different floors through a main feeder line and, in turn, through branch feeder lines branched from the main feeder line, comprising:
 (a) a main feeder assembly connected to an electric power supply-terminal,
  said main feeder assembly comprising a plurality of main line sections successively arranged vertically and a plurality of junction means respectively interposed between respective mutually adjacent main line sections and connecting the respective mutually adjacent main line sections therethrough;
  said plurality of main line sections each comprising at least one flat type cable which comprises an outer jacket and a plurality of insulated core conductors arranged in parallel in a substantially coplanar relationship and covered by said outer jacket, said plurality of insulated core conductors each comprising a plurality of element conductors covered by a sheath of an insulating material;

said at least one flat type cable having at least one end provided with a flat connector means electrically connected thereto;

said flat connector means having electric connector portions which are arranged in a row, said plurality of junction means each comprising at least one printed circuit board having, on at least one surface thereof, a predetermined pattern circuit, said at least one printed circuit board having a first connecting portion for detachably connecting thereto the flat connector means of the flat type cable of a main line section and a second connecting portion for detachably connecting thereto the flat connector means of the flat type cable of an adjacent main line section to said main line section;

said first connecting portion being electrically connected to said second connecting portion through said predetermined pattern circuit;

said at least one printed circuit board having at least one third connecting portion being electrically connected to said first and second connecting portions through said predetermined pattern circuit;

and
(b) a plurality of branch feeder lines respectively connected to a plurality of electric power-receiving portions located at different floors, said plurality of electric power-receiving portions each comprising at least one terminal equipment;

each branch feeder line comprising at least one feeder cable;

said at least one feeder cable having its one end connected to said at least one terminal equipment and having the other end provided with a flat connector means electrically connected thereto;

said flat connecting means to the other end of the feeder cable being detachably connected to the third connecting portion of the printed circuit board.

2. An electric power-feeding structure for feeding an electric power from an electric power-supply terminal to electric power-receiving portions located at different positions through a main feeder line and, in turn, through branch feeder lines branched from the main feeder line, which comprises:

a. a main feeder assembly connected to an electric power supply-terminal, said main feeder assembly comprising a plurality of main line sections successively arranged in a longitudinal direction of each of said main line sections and a plurality of junction means respectively interposed between respective mutually adjacent main line sections and connecting the respective mutually adjacent main line sections therethrough;

said plurality of main line sections each comprising at least one flat type cable which comprises an outer jacket and a plurality of insulated core conductors arranged in parallel in a substantially coplanar relationship and covered by said outer jacket, said plurality of insulated core conductors each comprising a plurality of element conductors covered by a sheath of an insulating material;

said at least one flat type cable having at least one end provided with a flat connector means electrically connected thereto;

said flat connector means having electric connector portions which are arranged in a row, said plurality of junction means each comprising at least one printed circuit board having, on at least one surface thereof, a predetermined pattern circuit, said at least one printed circuit board having a first connecting portion for detachably connecting thereto the flat connector means of the flat type cable of a main line section and a second connecting portion for detachably connecting thereto the flat connector means of the flat type cable of an adjacent main line section to said main line section;

said first connecting portion being electrically connected to said second connecting portion through said predetermined pattern circuit;

said at least one printed circuit board having at least one third connecting portion being electrically connected to said first and second connecting portions through said predetermined pattern circuit;

said at least one printed circuit board having, on its one surface thereof, a predetermined pattern circuit comprising a plurality of conductor paths for electrically connecting said first connecting portion to said second connecting portion, and having, on its opposite surface thereof, a predetermined pattern circuit comprising a plurality of conductor paths respectively extending from said at least one third connecting portion to predetermined positions for electrically connecting said at least one third connecting portion to said first and second connecting portions therethrough, the plurality of conductor paths provided on the one surface of the printed circuit board being electrically connected with the plurality of conductor paths provided on the opposite surface of the printed circuit board in accordance with a predetermined circuitry through a plurality of through-conductor paths passing through said printed circuit board in a thicknesswise direction thereof, said plurality of conductor paths of the one surface of the printed circuit board, said plurality of conductor paths of the opposite surface of the printed circuit board and said plurality of through-conductor paths cooperating with one another to electrically connect said first and second connecting portions to said at least one third connecting portion; and b. a plurality of branch feeder lines respectively connected to a plurality of electric power-receiving portions located at different positions respectively corresponding to the positions of said plurality of junction means, said plurality of electric power-receiving portions each comprising at least one terminal equipment;

each branch feeder line comprising at least one feeder cable;

said at least one feeder cable having its one end connected to said at least one terminal equipment and having the other end provided with a flat connector means electrically connected thereto;

said flat connecting means of the other end of the feeder cable being detachably connected to the third connecting portion of the printed circuit board.

3. An electric power-feeding structure according to claim 2, wherein each main line section comprises two or more of said flat type cables thicknesswise laid one upon another.

4. An electric power-feeding structure according to claim 2, wherein said feeder cable of each branch feeder line is a flat type cable comprising an outer jacket and a plurality of insulated core conductors arranged in parallel in a substantially coplanar relationship and covered by said outer jacket, said plurality of insulated core conductors each comprising a plurality of element conductors covered by a sheath of an insulating material.

5. An electric power-feeding structure according to claim 2, wherein the feeder cable of each branch feeder line is a round type cable comprising an outer jacket having a round shape in cross-section and a plurality of insulated core conductors covered by said outer jacket, said plurality of insulated core conductors each comprising a plurality of element conductors covered by a sheath of an insulating material.

6. An electric power-feeding structure for feeding an electric power from an electric power-supply terminal to electric power-receiving portions located at different positions through a main feeder line and, in turn, through branch feeder lines branched from the main feeder line, which comprises:

a. a main feeder assembly connected to an electric power supply-terminal, said main feeder assembly comprising a plurality of main line sections successively arranged in a longitudinal direction of each of said main line sections and a plurality of junction means respectively interposed between respective mutually adjacent main line sections and connecting the respective mutually adjacent main line sections therethrough;

said plurality of main line sections each comprising at least one flat type cable which comprises an outer jacket and a plurality of insulated core conductors arranged in parallel in a substantially coplanar relationship and covered by said outer jacket, said plurality of insulated core conductors each comprising a plurality of element conductors covered by a sheath of an insulating material;

said at least one flat type cable having at least one end provided with a flat connector means electrically connected thereto;

said flat connector means having electric connector portions which are arranged in a row, said plurality of junction means each comprising at least one printed circuit board having, on at least one surface thereof, a predetermined pattern circuit, said at least one printed circuit board having a first connecting portion for detachably connecting thereto the flat connector means of the flat type cable of a main line section and a second connecting portion for detachably connecting thereto the flat connector means of the flat type cable of an adjacent main line section to said main line section;

said first connecting portion being electrically connected to said second connecting portion through said predetermined pattern circuit;

said at least one printed circuit board having at least one third connecting portion being electrically connected to said first and second connecting portions through said predetermined pattern circuit;

said at least one printed circuit board having, on its one surface thereof, a first connecting portion and a second connecting portion and a predetermined pattern circuit comprising a plurality of conductor paths for electrically connecting said first connecting portion to said second connecting portion, said plurality of conductor paths having, at their respective intermediate portions, connecting means constituting said at least one third connecting portion; and b. a plurality of branch feeder lines respectively connected to a plurality of electric power-receiving portions located at different positions respectively corresponding to the positions of said plurality of junction means, said plurality of electric power-receiving portions each comprising at least one terminal equipment;

each branch feeder line comprising at least one feeder cable;

said at least one feeder cable having its one end connected to said at least one terminal equipment and having the other end provided with a flat connector means electrically connected thereto;

said flat connecting means of the other end of the feeder cable being detachably connected to the third connecting portion of the printed circuit board.

7. An electric power-feeding structure according to claim 6, wherein each main line section comprises two or more of said flat type cables thicknesswise laid one upon another.

8. An electric power-feeding structure according to claim 6, wherein said feeder cable of each branch feeder line is a flat type cable comprising an outer jacket and a plurality of insulated core conductors arranged in parallel in a substantially coplanar relationship and covered by said outer jacket, said plurality of insulated core conductors each comprising a plurality of element conductors covered by a sheath of an insulating material.

9. An electric power-feeding structure according to claim 6, wherein the feeder cable of each branch feeder line is a round type cable comprising an outer jacket having a round shape in cross-section and a plurality of insulated core conductors covered by said outer jacket, said plurality of insulated core conductors each comprising a plurality of element conductors covered by a sheath of an insulating material.

* * * * *